US008448141B2

(12) United States Patent
Blount et al.

(10) Patent No.: US 8,448,141 B2
(45) Date of Patent: May 21, 2013

(54) EVALUATION OF SOFTWARE BASED ON CHANGE HISTORY

(75) Inventors: Lawrence Blount, Tucson, AZ (US); Eitan Daniel Farchi, Pardes Hana (IL); Shachar Fienblit, Ein Ayala (IL); Sergey Novikov, Tel-Aviv (IL); Orna Raz-Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1414 days.

(21) Appl. No.: 12/058,774

(22) Filed: Mar. 31, 2008

(65) Prior Publication Data

US 2009/0249298 A1    Oct. 1, 2009

(51) Int. Cl.
*G06F 9/44* (2006.01)
*G06F 11/00* (2006.01)

(52) U.S. Cl.
USPC ............. 717/125; 714/33; 717/101; 717/120; 717/122; 717/124; 717/128; 717/131; 717/170

(58) Field of Classification Search
None
See application file for complete search history.

(56) References Cited

U.S. PATENT DOCUMENTS

| | | | | |
|---|---|---|---|---|
| 6,513,154 | B1* | 1/2003 | Porterfield | 717/101 |
| 6,757,893 | B1* | 6/2004 | Haikin | 717/170 |
| 6,804,634 | B1* | 10/2004 | Holzmann et al. | 714/33 |
| 7,028,290 | B2* | 4/2006 | Srivastava et al. | 717/124 |
| 7,840,844 | B2* | 11/2010 | Garland et al. | 717/124 |
| 7,886,272 | B1* | 2/2011 | Episkopos et al. | 717/124 |
| 2002/0049962 | A1* | 4/2002 | Kelbaugh et al. | 717/128 |
| 2003/0066049 | A1* | 4/2003 | Atwood et al. | 717/101 |
| 2004/0205727 | A1* | 10/2004 | Sit et al. | 717/125 |
| 2005/0223357 | A1* | 10/2005 | Banerjee et al. | 717/120 |
| 2006/0168565 | A1* | 7/2006 | Gamma et al. | 717/122 |
| 2007/0016894 | A1* | 1/2007 | Sreedhar | 717/131 |
| 2007/0094542 | A1* | 4/2007 | Bartucca et al. | 714/38 |
| 2007/0168959 | A1* | 7/2007 | Bayari et al. | 717/120 |
| 2008/0295085 | A1* | 11/2008 | Rachamadugu et al. | 717/159 |
| 2009/0144698 | A1 | 6/2009 | Fanning et al. | |

OTHER PUBLICATIONS

Rothermel et al., Prioritizing Test Cases for Regression Testing [online], Oct. 2001, IEEE Transactions on Software Engineering, vol. 27 No. 10 [Retreived on Sep. 30, 2011]. Retrieved from the internet: <URL: http://ieeexplore.ieee.org/stamp/stamp.jsp?arnumber=00962562, pp. 929-948.*
Amitabh Srivastava et al., Effectively prioritizing test in development environment, ACM vol. 27 Issue 4, Jul. 2002, [Retrieved on Jul. 24, 2012]. Retrieved from the internet: <URL: http://dl.acm.org/citation.cfm?id=566187> 9 Pages (97-106).*
Karl Fogel, Producing Open Source Software: How to Run a Successful Free Software Project, 2005, [Retrieved on Jan. 7, 2003]. Retrieved from the internet: <URL: http://producingoss.com/en/producingoss.pdf> 202 Pages (1-202).*
Huzefa Kagdi et al., A survey and taxonomy of approaches for mining software repositories in the context of software evolution, 2007, [Retrieved on Jan. 7, 2013]. Retrieved from the internet: <URL: http://gate.ac.uk/sale/dd/related-work/tao-related/2007+Kagdi+Survey+for+mining+software+repositories.pdf> 55 Pages (78-131).*

* cited by examiner

*Primary Examiner* — Don Wong
*Assistant Examiner* — Anibal Rivera
(74) *Attorney, Agent, or Firm* — Daniel Kligler

(57) ABSTRACT

A method for software processing includes obtaining change information, which records changes that have been performed in respective locations in software code. The change information is processed so as to assign to at least some of the locations respective priorities, which are indicative of respective likelihoods that the locations contain program faults. The at least some of the locations are presented to a user in accordance with the assigned priorities.

23 Claims, 2 Drawing Sheets

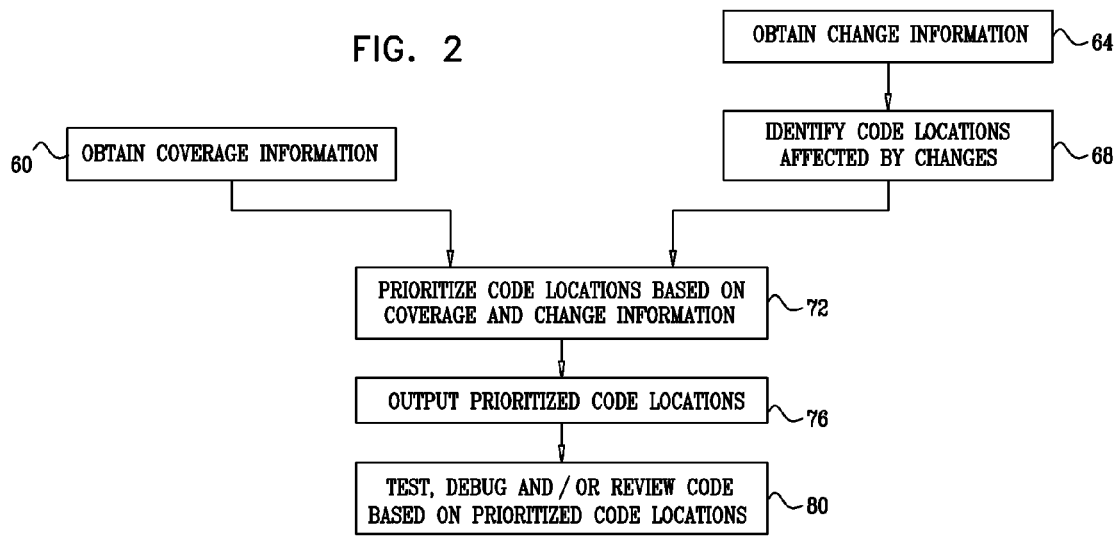

EVALUATION OF SOFTWARE BASED ON CHANGE HISTORY

BACKGROUND

The present invention relates generally to computer software, and particularly to methods and systems for operating on software code based on information regarding changes performed in the code.

Software code is commonly tested for faults ("bugs") by subjecting the code to a set of test cases, referred to as a test suite. It is often of interest to assess the coverage of the test suite, i.e., the amount of code that is actually executed by the test cases. Various methods for assessing test coverage are known in the art. Test coverage assessment is sometimes used for improving the test suite. In many cases, a correlation exists between the occurrence of software faults in given software code and changes that have been performed in the code during its development process.

BRIEF SUMMARY

Embodiments of the present invention provide a method for software processing. The method includes obtaining change information, which records changes that have been performed in respective locations in software code. The change information is processed so as to assign to at least some of the locations respective priorities, which are indicative of respective likelihoods that the locations contain program faults. The at least some of the locations are presented to a user in accordance with the assigned priorities. Other disclosed embodiments provide apparatus for software processing.

The present invention will be more fully understood from the following detailed description of the embodiments thereof, taken together with the drawings in which:

BRIEF DESCRIPTION OF THE SEVERAL VIEWS OF THE DRAWINGS

FIG. 2 is a flow chart that schematically illustrates a method for testing, debugging or reviewing software, in accordance with an embodiment of the present invention.

DETAILED DESCRIPTION

Overview

Figure 1:
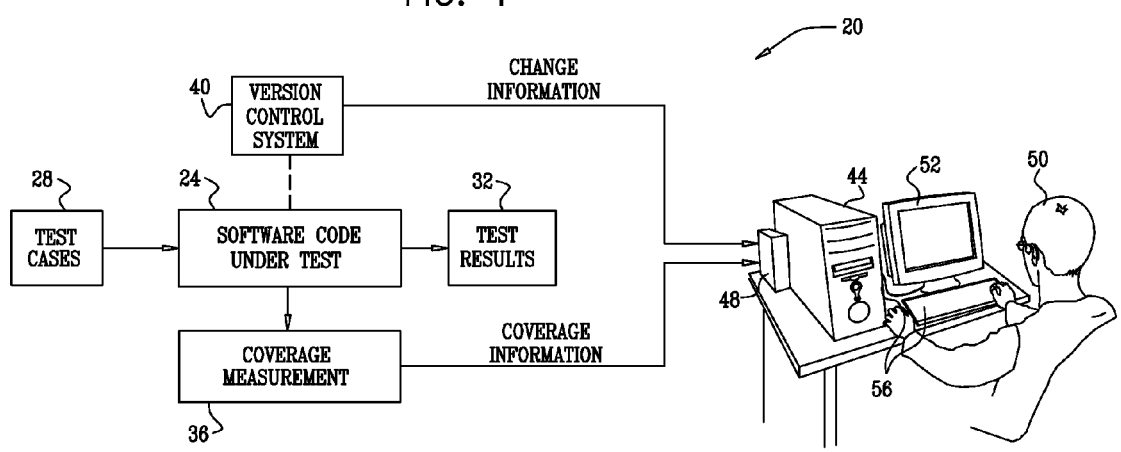
FIG. 1 is a block diagram that schematically illustrates a system for software testing, in accordance with an embodiment of the present invention.

Embodiments of the present invention provide improved methods and systems for testing, reviewing, debugging, and generally operating on software code. The methods and systems described herein make use of the correlation between software changes that were performed at certain locations in software code, and the presence of software faults ("bugs") in these locations.

In some embodiments that are described hereinbelow, a Version Control System (VCS) tracks the development process of given software code, and in particular stores information pertaining to changes performed in the code. This information is referred to herein as change information. A prioritization processor obtains the change information from the VCS, and assigns priorities to respective locations of the code (e.g., to files, lines or functions) based on the change information. The assigned priorities are indicative of likelihoods that the locations contain bugs. The processor outputs a prioritized list of code locations to a user. The user performs an operation with respect to the software code, e.g., tests, reviews or debugs the code, based on the prioritized list of locations.

Since software changes are often correlative with bugs, the prioritized list focuses the user's attention on code locations that are most likely to contain bugs. The process of testing, reviewing or debugging the software code can be modified based on the prioritized list, so as to concentrate on fault-prone code locations first. When resources are limited, such prioritization may considerably improve the quality of software testing, review or debugging.

In some embodiments related to testing, the prioritization processor combines the change information with coverage information, which assesses the level of coverage of different code locations by a given set of test cases. In these embodiments, the prioritization processor assigns the priorities based on both the change information and the coverage information. In other words, the processor assigns high priorities to code locations that are likely to contain bugs but currently lack coverage. Modifying the test procedure based on the prioritized list may significantly improve testing quality and efficiency.

Various criteria and heuristics can be used for assigning priorities to code locations. Several exemplary criteria are described herein. In some embodiments, the prioritization processor selects the prioritization criteria to match the type of testing being conducted.

System Description

FIG. 1 is a block diagram that schematically illustrates a system 20 for software testing, in accordance with an embodiment of the present invention. System 20 tests software code 24 by subjecting the code to test cases 28. The test procedure produces test results 32, which typically indicate identified faults and additional information for debugging purposes.

System 20 comprises a coverage measurement unit 36, which assesses the coverage achieved by test cases 28 and produces coverage information. The coverage information may indicate, for example, locations in the code that were covered by the test cases, locations that were not covered by the test cases, quantitative measures of coverage or lack of coverage, and/or any other information that is indicative of coverage of code 24 by test cases 28.

System 20 further comprises a Version Control System (VCS) 40. The VCS typically tracks the development process of code 24 and stores controlled versions of the code. VCS 40 may comprise any sort of computerized version control or configuration control system, or any suitable database or other data structure that stores information regarding the development process of software code 24.

In particular, VCS 40 stores information regarding changes that have been performed in the code during the different stages of its development, as well as additional information regarding these changes. For a given change, this information may comprise, for example, the locations in the code in which the change was made, the time at which the change was made, the applicable version number, the classification of the change, the reason for the change, information regarding a known software fault that the change was meant to correct, and/or any other information related to changed performed on the code.

A given change is typically performed in a particular location, or set of locations, of the code. In the context of the present patent application and in the claims, the terms "location" or "code location" refer to any desired partition of the software code, such as, for example, files, program lines, program addresses, functions, basic blocks, objects (e.g., classes in an object-oriented code) and/or variables.

The coverage information produced by unit 36 and the change information stored in VCS 40 are both provided to a prioritization processor 44. Processor 44 processes the coverage information and the change information jointly, using methods and heuristics that are described below, and produces a prioritized list of code locations.

Typically, processor 44 comprises a general-purpose computer, which is programmed in software to carry out the functions described herein. The software may be downloaded to the computer in electronic form, over a network, for example, or it may alternatively be supplied to the computer on tangible media, such as CD-ROM. In some embodiments, the functions of two or more components of system 20 may be carried out by a single processor. For example, the functions of processor 44 and unit 36 may be carried out by a single workstation, possibly together with a test generation unit that produces test cases 28.

In a typical implementation, the VCS resides on a server that is separate from the computer or computers used for developing the software. The test cases may be created manually or by a suitable automatic test generation means. The test cases may run either on the test developer's computer or on a computer that runs the developed software code. Coverage information is typically collected and stored as part of the test procedure. Following the test procedure, the coverage information is retrieved and analyzed, either on the same computer used for running the tests or on a different computer. Alternatively, any other suitable configuration or division of functions among different computers can be used.

Focusing Attention on Fault-Prone Code Locations Based on Change History

The list of code locations produced by processor 44 is prioritized in accordance with the likelihood that the locations contain faults, based on the coverage information and the change information. Typically, the list is presented in descending order of priority, i.e., presents the locations that are less covered and are most likely to contain bugs first. Thus, the prioritized list focuses attention to code locations that are likely to contain bugs but currently lack coverage. Other locations (i.e., locations that are already well-covered and locations that are less likely to contain bugs) are assigned lower priorities and appear further down the list.

In some embodiments, coverage measurement unit 36 calculates coverage metrics for different code locations. The metric value assigned to a certain code location is indicative of the level of coverage of this location by test cases 28. In these embodiments, processor 44 may produce the prioritized list of code locations by adjusting the coverage metrics based on the change information. For example, processor 44 may apply weights to the coverage metrics. The weight applied to the coverage metric of a certain code location depends on the likelihood that this location contains a bug, as indicated by the change information.

The coverage information and change information is provided to processor 44 via an interface 48. The functionality of the interface may vary depending on the specific coverage measurement unit and version control system that are used. The interface may proactively request information from unit 36 or VCS 40, and/or passively accept information sent to it as it becomes available. Processor 44 typically presents the prioritized list of code locations to a user 50 using a suitable output device, such as a display 52. The user interacts with processor 44 using a suitable input device 56, such as a mouse or keyboard.

User 50 may perform various actions with respect to the software code based on the prioritized list of code locations. For example, the user may modify test cases 28 (e.g., add, delete or modify test cases) in order to focus on locations that are likely to contain bugs and/or to improve coverage. When testing time or testing resources are limited, the user may modify the order in which test cases are applied, so as to cover fault-prone locations first.

In the embodiment shown in FIG. 1, processor 44 prioritizes the list of code locations based on both coverage information and change information. In alternative embodiments, however, processor 44 may prioritize the list irrespective of coverage, i.e., based only on change information. Thus, in a simpler configuration, unit 36 may be omitted.

Although the configuration of FIG. 1 refers to a system for software testing, the principles of the present invention can also be used in other types of operations and actions performed on software. For example, when reviewing software, reviewing resources (e.g., time and/or availability of human reviewers) are often limited. In many cases, only a small part of the code can be reviewed within the available resources. In such situations, system 20 may present a prioritized list of code locations to be reviewed, so that code locations that are most likely to contain bugs are reviewed first. Similarly, when debugging the software code, code locations that are most likely to contain bugs can be presented and debugged first.

Prioritization processor 44 may apply various criteria, rules or heuristics for assigning priorities to code locations based on change-related information. For example, the priority may reflect the amount or extensiveness of the changes performed in a given code location. In other words, code locations that have changed the most will be assigned high priority. Additionally or alternatively, the priorities may depend on the times in which the changes were made. For example, code locations that have changed recently may be viewed as more likely to contain bugs, and may therefore be assigned higher priorities.

As another example, newly-added code may be regarded as changed code. Thus, processor 44 may assign high priorities to code locations in which code was added recently. As yet another example, changes that were performed for the purpose of correcting previously-found faults may be viewed as more likely to introduce new faults. Processor 44 may thus give high priority to changes of this kind. Further additionally or alternatively, processor 44 may assign the priorities based on any other suitable criterion or heuristic. The processor may also assign the priorities based on a combination of two or more criteria.

In some embodiments, the priorities may be binary (e.g., one priority level is assigned to code locations that have changed, and another priority level is assigned to unchanged locations). In alternative embodiments, the priorities may assume multiple or even continuous values (e.g., a priority that is proportional to the number of changes performed in the corresponding code location, a priority calculated as a function of the time that elapsed from occurrence of the change, a priority that is calculated as a function of the number, severity and/or type of changes performed in the location, or a priority that gives different weights to different types of changes).

Software testing may comprise various types of tests, which are often conducted at different stages of code development. For example, small isolated units of the code are often tested separately before integrating them with one another. Such tests are often referred to as unit tests. Another type of test, referred to as a function test, examines the interrelations between different software units. An integrated set of software units, or a fully-integrated software product, may be subjected to a system test, which tests functionality as well as performance. In some cases, the code may be subjected to a "smoke test," typically comprising a quick go/no-go test that tests the general functionality of the code. Yet another type of test tests a previously-tested code after the addition of a new component. This type of test, which is sometimes referred to as a regression test, verifies that the newly-added component does not introduce new faults into the system. Software is sometimes tested for compatibility with different hardware configurations. These tests are commonly referred to as configuration tests.

In many cases, each type of test focuses on finding different types of faults. Therefore, different types of tests may benefit the most from different change-related prioritization criteria. In some embodiments, prioritization processor 44 assigns priorities to code locations based on different criteria, depending on the type of test that is being conducted.

For example, prioritization that is based on known bug patterns is often suitable for unit tests. Prioritization that assigns high priority to code locations that have changed due to correction of a previous bug often performs well in smoke tests. Code locations that have been changed in order to correct concurrency-related faults or performance-related faults (or any other system-wide concerns) may be particularly meaningful in system tests. Assigning high priorities to code locations that have been changed in response to defects may be most suitable for regression tests. A prioritization that assigns high priorities to code locations that have changed in response to hardware configuration problems are typically suitable for configuration tests. Some test types may use prioritization that gives high priority to code locations that were changed due to bugs in error-handling scenarios (e.g., in code locations related to exceptions).

Note that some prioritization criteria may depend on specific types of change information that are not always available from VCS 40. For example, in order to prioritize code locations based on changes that are associated with a particular previously-found bug, the VCS should store information that correlates changes with known bugs. This type of information is not always available. Other types of change information, such as the time in which the change was performed, are usually available from most version control systems. Some VCSs provide means for adding fields that describe bugs, bug patterns and/or the measures taken to correct them. Some VCSs do not provide such capabilities. The actual use of such fields, when available, often varies considerably from one software project to another. Therefore, some prioritization criteria may be applicable only in conjunction with a suitable VCS, which is able to provide the desired information.

Prioritization Method Description

FIG. 2 is a flow chart that schematically illustrates a method for testing, debugging or reviewing software, in accordance with an embodiment of the present invention. The method begins with prioritization processor 44 of system 20 obtaining coverage information from coverage measurement unit 36, at a coverage information input step 60. Processor 44 also obtains change-related information from VCS 40, at a change information input step 64. The processor identifies code locations that have undergone changes, at a location identification step 68. Steps 60 and 64-68 may be carried out in any order, in order to provide processor 44 with both coverage information and change information.

Prioritization processor 44 prioritizes the code locations based on the obtained coverage information and change information, at a prioritization step 72. Processor 44 may apply any suitable criteria for assigning priorities to code locations, such as any other criteria and heuristics described above. In some embodiments, processor 44 selects the criteria based on the type of software testing procedure that is being conducted.

Processor 44 outputs the prioritized list of code locations, at an output step 76. For example, the prioritization processor may present the list to user 50 using display 52. User 50 then performs a certain action with respect to the software code based on the prioritized list of code locations, at an operation step 80. As explained above, the user may test, review or debug the software, or modify the testing, reviewing or debugging process, based on the prioritized list.

Exemplary Implementations

Processor 44 may use various techniques for assigning priorities to code locations based on the coverage and change information obtained for these locations. In some embodiments, the processor defines a function that assigns a positive coverage score to each line of the software code.

The lines of the software code are grouped into coverage tasks. Each coverage task may comprise part of a line, a single line or multiple lines. The task sizes typically depend on the type of the coverage assessment being performed by coverage measurement unit 36. For example, when performing basic block coverage, the coverage tasks typically comprise basic blocks. When performing statement coverage, the tasks typically comprise source code lines. Each coverage task is assigned a composite coverage score that depends on the individual coverage scores of its lines, such as the average or maximum score within the task.

Processor 44 adjusts the priorities of the coverage tasks based on the change information, and orders the prioritized list in accordance with the adjusted priorities. In some embodiments, the list is ordered in classes. For example, processor 44 may classify the coverage tasks into uncovered, lightly-covered and heavily-covered tasks. The processor may present the uncovered tasks first, in descending order of their weighted (i.e., change-related) priorities. Lightly-covered tasks may be presented next, in descending order of their weighted priorities. The heavily-covered tasks may be presented last, either with or without prioritizing. In alternative embodiments, the processor may classify the tasks into any other suitable number of classes. For example, uncovered and lightly-covered tasks may be regarded as a single class.

The processor may calculate and assign change-related adjustments (weights) to the different tasks in various ways. For example, in some embodiments the processor identifies a set of anchor lines in the software code. An anchor line is defined as a line that has not undergone any changes in any of the code versions. A virtual anchor line is also added before the first line and after the last line of the code. For each section that lies between two adjacent anchor lines, processor 44 assigns a weight according to the number of versions in which a change was performed in the section.

In another possible implementation, processor 44 updates the change-related weights in response to several types of changes, such as the insertion of a new line, the deletion of a line, the updating or replacement of a line, and the replacement of a block of n lines by a block of k lines. The processor accumulates the weights of the different coverage tasks over the different changes and code versions.

For example, the processor may create and maintain an ordered set of blocks of lines, with each block having a corresponding change-related weight. The processor initially considers each line of the first version of the code as a separate block, and initializes the change-related weight of each block to zero. Then, the processor advances sequentially from one code version to the next, and updates the weights in accordance with the changes performed in the currently-examined version.

For a given change within a given version, if the change spans multiple blocks, the processor combines them into a single block and assigns the new block a weight that depends on the weights of the multiple blocks. The new weight may comprise, for example, the maximum or average of the weights of the individual blocks. The processor increments the weight assigned to the new block by one, in order to account for the change.

If the change inserts new lines between existing blocks, the processor combines the two blocks and the new lines into a single block, and assigns this block a weight that depends on the weights of the individual blocks (e.g., maximum or average of the individual block weights). The processor then increments the weight assigned to the new block by one, in order to account for the change. For changes that delete lines, if the block in which lines were deleted becomes empty, the processor deletes it. If the block remains non-empty, the processor increments the block weight by one, so as to account for the change. If the change updates a line or replaces a line with another line, the processor increments the block weight by one. If the change replaces a block of n lines with a block of k lines, then the new k-line block is assigned the weight of the previous n-line block, and is then incremented to account for the change.

Although the embodiments described above mainly address assigning priorities to locations of software code that subsequently executes on a suitable processor, the methods and systems described herein can also be used for prioritizing code locations in firmware code. The firmware code may be written in any suitable language, such as in C. In the context of the present patent application and in the claims, such code is also regarded as a sort of software code.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for software processing, comprising:
   obtaining, by a processor, change information, which records changes that have been performed in respective locations in software code;
   processing the change information, by the processor, so as to assign to at least some of the locations respective priorities from a scale including at least three priority levels, which priorities are indicative of respective likelihoods that the locations contain program faults, wherein the priorities are assigned responsively to the numbers, extents or types of the changed performed in the at least some of the locations; and
   presenting the at least some of the locations to a user in accordance with the assigned priorities.

2. The method according to claim 1, wherein obtaining the change information comprises communicating with a Version Control System (VCS) that stores the change information.

3. The method according to claim 1, wherein presenting the at least some of the locations comprises presenting a list of the at least some of the locations in descending order of the priorities.

4. The method according to claim 1, and comprising acting on the software code responsively to the priorities.

5. The method according to claim 4, wherein acting on the software code comprises testing the software code by subjecting the code to a set of test cases and modifying the set of test cases responsively to the priorities.

6. The method according to claim 5, wherein testing the software code comprises applying to the code a test of a given type, and wherein processing the change information comprises selecting a prioritization criterion responsively to the given type of the test and assigning the priorities in accordance with the selected prioritization criterion.

7. The method according to claim 5, wherein testing the software comprises obtaining coverage information, which assesses a coverage level of one or more of the locations by the set of test cases, and wherein processing the change information comprises assigning the priorities responsively to both the change information and the coverage information.

8. The method according to claim 7, wherein assigning the priorities comprises:
   assigning coverage scores to respective lines of the software responsively to the coverage information;
   grouping the lines into coverage tasks, and assigning the coverage tasks respective composite coverage scores; and
   adjusting the composite coverage scores of the coverage tasks responsively to the change information, so as to produce the priorities.

9. The method according to claim 4, wherein acting on the software code comprises reviewing the code in at least some of the locations by the user responsively to the priorities.

10. The method according to claim 4, wherein acting on the software code comprises debugging the program faults in the at least some of the locations responsively to the priorities.

11. The method of claim 1, wherein processing the change information comprises assigning the priorities responsively to extents of the changes that were performed in the at least some of the locations.

12. The method of claim 1, wherein processing the change information comprises assigning the priorities responsively to occurrence times of the changes that were performed in the at least some of the locations.

13. The method of claim 1, wherein assigning responsively to the types of the changes comprises assigning different priority weights to insertion changes and deletion changes.

14. The method of claim 1, wherein processing so as to assign to at least some of the locations respective priorities comprises assigning priorities from a scale including at least two high priorities and at least two low priorities.

15. The method according to claim 1, wherein acting on the software code comprises acting on the faults in an order determined responsively to the priorities.

16. Apparatus for software processing, comprising:
   an interface, which is operative to obtain change information, which records changes that have been performed in respective locations in software code; and
   a processor, which is configured to process the change information so as to assign to at least some of the locations respective priorities from a scale including at least three priority levels, which priorities are indicative of respective likelihoods that the locations contain program faults, wherein the priorities are assigned responsively to the numbers, extents or types of the changed performed in the at least some of the locations and to present the at least some of the locations to a user in accordance with the assigned priorities.

17. The apparatus according to claim 16, wherein the processor is configured to assign the priorities in accordance with a criterion that is based on at least one characteristic of the change information selected from a group of characteristics consisting of numbers of the changes, severities of the changes, occurrence times of the changes and types of the changes that were performed in the at least some of the locations.

18. The apparatus according to claim 16, wherein the interface is operative to communicate with a Version Control System (VCS) so as to obtain the change information.

19. The apparatus according to claim 16, wherein the processor is configured to present a list of the at least some of the locations in descending order of the priorities.

20. The apparatus according to claim 16, and comprising a test system, which is configured to test the software code by subjecting the code to a set of test cases and to modify the set of test cases responsively to the priorities.

21. The apparatus according to claim 20, wherein the test system is configured to apply to the code a test of a given type, and wherein the processor is configured to select a prioritization criterion responsively to the given type of the test and to assign the priorities in accordance with the selected prioritization criterion.

22. The apparatus according to claim 20, wherein the interface is further operative to obtain coverage information, which assesses a coverage level of one or more of the locations by the set of test cases, and wherein the processor is configured to assign the priorities responsively to both the change information and the coverage information.

23. The apparatus according to claim 22, wherein the processor is configured to assign coverage scores to respective lines of the software responsively to the coverage information, to group the lines into coverage tasks, to assign the coverage tasks respective composite coverage scores, and to adjust the composite coverage scores of the coverage tasks responsively to the change information, so as to produce the priorities.

* * * * *